(12) United States Patent
Lear (10) Patent No.: US 12,338,767 B2
(45) Date of Patent: Jun. 24, 2025

(54) GAS TURBINE INLET COOLING FOR CONSTANT POWER OUTPUT

(71) Applicant: University of Florida Research Foundation, Inc., Gainesville, FL (US)

(72) Inventor: William E. Lear, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 18/037,161

(22) PCT Filed: Oct. 13, 2021

(86) PCT No.: PCT/US2021/071843
§ 371 (c)(1),
(2) Date: May 16, 2023

(87) PCT Pub. No.: WO2022/109512
PCT Pub. Date: May 27, 2022

(65) Prior Publication Data
US 2023/0417187 A1     Dec. 28, 2023

Related U.S. Application Data

(60) Provisional application No. 63/114,651, filed on Nov. 17, 2020.

(51) Int. Cl.
*F02C 3/34* (2006.01)
*F02C 3/30* (2006.01)
(Continued)

(52) U.S. Cl.
CPC .................. *F02C 3/34* (2013.01); *F02C 3/30* (2013.01); *F02C 6/18* (2013.01); *F02C 7/143* (2013.01);
(Continued)

(58) Field of Classification Search
CPC .............. F02C 3/34; F02C 6/18; F02C 7/143
See application file for complete search history.

(56) References Cited

U.S. PATENT DOCUMENTS 6,860,109 B2     3/2005  Tsuji
8,056,318 B2 *  11/2011  Chillar ..................... F02C 3/34
                                              60/39.12

(Continued)

OTHER PUBLICATIONS

International Search Report and Written Opinion dated Feb. 14, 2022 for PCT Patent Application No. PCT/US2021/071843. Copy Provided.

*Primary Examiner* — Ted Kim
(74) *Attorney, Agent, or Firm* — Thomas | Horstemeyer, LLP (57) ABSTRACT

The present disclosure presents improved combustion turbine engine systems and related methods. One such system includes a turbine system comprising a high pressure compressor, a high pressure turbine, a combustor, and a recuperator. The system further includes a turbocharger system comprising a low pressure compressor and a low pressure turbine; an air cooler device that is configured to cool intake air output to the low pressure compressor; and a refrigeration system comprising a hot gas heat exchanger and a cold gas heat exchanger, wherein the refrigeration system receives combustion products from the turbine system and compressed air from the turbocharger system. The refrigeration system cools the combustion products and the compressed air to generate a cooled combustion product mixture that is provided to the turbine system, and the refrigeration system further generates steam that is provided to the turbine system. Other systems and methods are also presented.

8 Claims, 10 Drawing Sheets

(51) Int. Cl.
*F02C 6/18* (2006.01)
*F02C 7/143* (2006.01)
(52) U.S. Cl.
CPC .. *F05D 2260/212* (2013.01); *F05D 2260/213* (2013.01)

(56) References Cited

U.S. PATENT DOCUMENTS

| | | | |
|---|---|---|---|
| 2005/0028529 A1* | 2/2005 | Bartlett | F02C 3/34 60/39.52 |
| 2007/0034171 A1* | 2/2007 | Griffin | F02C 3/34 122/479.1 |
| 2008/0104958 A1 | 5/2008 | Finkenrath | |
| 2016/0138431 A1* | 5/2016 | Lear, Jr. | F22B 1/1815 60/39.182 |
| 2017/0058737 A1 | 3/2017 | Mittricker | |
| 2018/0100694 A1 | 4/2018 | Krishnamurthy et al. | |
| 2019/0078513 A1 | 3/2019 | Lear | |

\* cited by examiner

GAS TURBINE INLET COOLING FOR CONSTANT POWER OUTPUT

CROSS-REFERENCE TO RELATED APPLICATION

This application is the 35 U.S.C. § 371 national stage application of International Application No. PCT/US2021/071843, filed Oct. 13, 2021, which claims priority to U.S. provisional application entitled, "Gas Turbine Inlet Cooling for Constant Power Output," having Ser. No. 63/114,651, filed Nov. 17, 2020, which is entirely incorporated herein by reference.

TECHNICAL FIELD

The present disclosure is generally related to combustion turbine engine systems.

BACKGROUND

Combustion turbine engines can be used to generate mechanical power and/or electricity. To this end, a combustion turbine engine can ignite a mixture of fuel and air in order to drive a turbine shaft. A byproduct of the combustion can be the production of heat and water.

Numerous system modifications have been proposed previously for increasing the performance of combustion turbine engines, such as reheat cycles, humid air cycles, inlet cooling, and inlet water fogging. Each of these approaches offers benefits, but at the expense of additional system complexity and cost.

SUMMARY

Embodiments of the present disclosure provide improved combustion turbine engine systems and related methods. Briefly described, one embodiment of the system, among others, includes a turbine system comprising a high pressure compressor, a high pressure turbine, a combustor, and a recuperator. The system further includes a turbocharger system comprising a low pressure compressor and a low pressure turbine; an air cooler device that is configured to cool intake air output to the low pressure compressor; and a refrigeration system comprising a hot gas heat exchanger and a cold gas heat exchanger, wherein the refrigeration system receives combustion products from the turbine system and compressed air from the turbocharger system. The refrigeration system cools the combustion products and the compressed air to generate a cooled combustion product mixture that is provided to the turbine system, and the refrigeration system further generates steam that is provided to the turbine system.

The present disclosure can also be viewed as providing combustion turbine engine methods. In this regard, one embodiment of such a method, among others, can be broadly summarized by the operations of generating water using a refrigeration system of a combustion turbine engine (CTE) system; heating the water using the refrigeration system to generate steam; providing the steam to a recuperator of a turbine system for the CTE system; cooling intake air, via an air cooler device, to a low pressure compressor of a turbocharger system; compressing the cooled intake air using the low pressure compressor of the turbocharger system; mixing the compressed air with combustion products from the turbine system; providing the mixture of combustion products from the turbine system and compressed air from the turbocharger system to the refrigeration system; cooling the mixture of combustion products and compressed air using the refrigeration system to generate a cooled combustion product mixture; removing, by a carbon dioxide ($CO_2$) component, $CO_2$ from the cooled combustion product mixture; and/or providing the cool combustion product mixture to a high pressure compressor of the turbine system from the $CO_2$ removal component.

In one or more aspects, the system/method may further comprise a carbon dioxide ($CO_2$) removal component, wherein the cooled combustion product mixture is provided to the carbon dioxide ($CO_2$) removal component before being supplied to the high pressure compressor of the turbine system; a carbon dioxide ($CO_2$) removal component that processes a discharge of the high pressure compressor to remove carbon dioxide before supplying the discharge to the recuperator; a warm gas heat exchanger that is associated with the refrigeration system, wherein the warm gas heat exchanger cools a mixture of the combustion product from the turbine system and the compressed air; and/or a pump that is associated with the refrigeration system, wherein the pump provides cold water to a warm gas heat exchanger that heats the cold water.

In one or more aspects of the system/method, the combustion product from the turbine system is received at the hot gas heat exchanger of the refrigeration system and the system/method further comprises a warm gas heat exchanger that is associated with the refrigeration system, wherein the warm gas heat exchanger cools a mixture of the combustion product from the hot gas heat exchanger and the compressed air; and a carbon dioxide ($CO_2$) removal component that processes the combustion product from the hot gas heat exchanger before the combustion product is mixed with the compressed air and supplied to the warm gas heat exchanger.

In one or more aspects of the system/method, the high pressure compressor is deployed in multiple stages comprising a first high pressure compressor unit, a warm gas heat exchanger unit, a cold gas heat exchanger unit, and a second high pressure compressor unit. Alternatively, in one or more aspects of the system/method, the high pressure compressor is deployed in multiple stages comprising a first high pressure compressor unit, a warm gas heat exchanger unit, a gas dehydration chamber, a cold gas heat exchanger unit, and a second high pressure compressor unit, such that operations performed by the system/method may further comprise chilling, by the gas dehydration chamber, a hydrophilic desiccant material to a sub-freezing temperature; and exposing, within the gas dehydration chamber, gas exiting from the warm gas heat exchanger unit with the chilled hydrophilic desiccant material before directing the gas to the cold gas heat exchanger unit.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure is directed towards an improved combustion turbine engine systems (CTE) and related methods. In some embodiments, such a CTE system can automatically capture much of the fresh water that is generated in the combustion process that drives the CTE system, as well as capturing water from the incoming humid air. In addition, the fresh water that is generated can be used by the CTE system to enhance system efficiency. Further, inlet air for the CTE system is cooled before entering the low pressure compressor of the CTE system.

While existing gas turbine systems are sometimes provided with a means to cool the inlet air to a nominal temperature in order to allow nearly constant efficiency, power output, and emissions, hotter temperature means that the low pressure compressor (part of the turbocharger module) would produce a smaller pressure rise, which would result in a lower power output. An exemplary CTE system of the present disclosure includes a heat exchanger component (air cooler device) before the low pressure compressor (i.e. at the air inlet for the CTE system), such that maintaining low temperature (via the air cooler) of the air entering the CTE system ensures the maintenance of constant power output. In various embodiments, a portion of a cooling capacity of a refrigeration system can be used for cooling the inlet air. Such innovation is important because hot weather tends to increase demand on the grid, so keeping power output high in hot weather has a large economic benefit (less additional capacity required).

Figure 1:
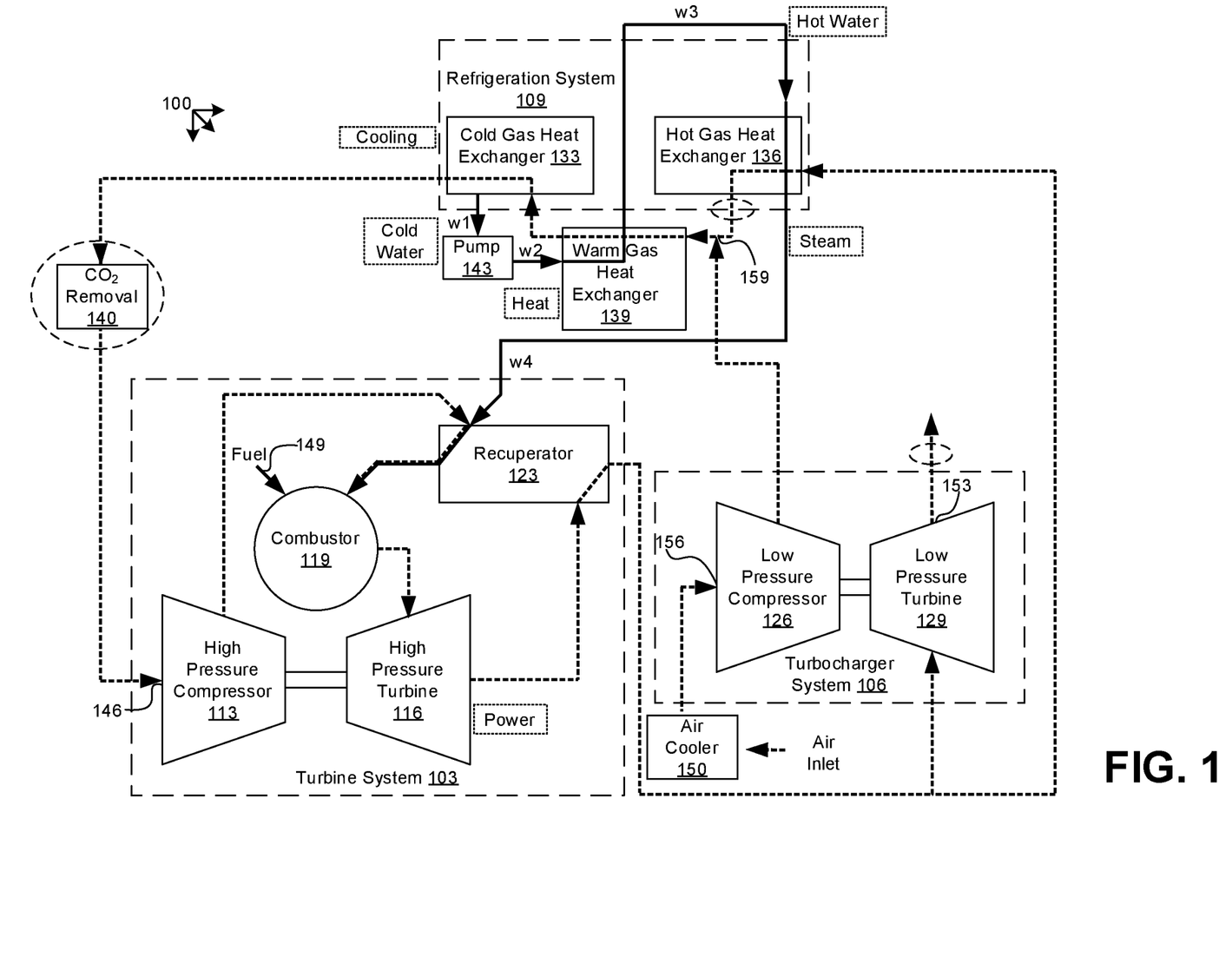
FIG. 1 is a drawing of an exemplary combustion turbine engine (CTE) system according to various embodiments of the present disclosure.

With reference to FIG. 1, shown is an example of a CTE system 100 in accordance with various embodiments of the present disclosure. The CTE system 100 can be used within in an electric grid network that comprises multiple systems that provide electricity for the electric grid. In alternative examples, the CTE system 100 can be a stand-alone system that, for example, provides electricity in emergency situations, for loads that do not have access to an electric grid, for military operations (e.g., forward operating bases), and/or other systems.

As shown, the CTE system 100 can include a turbine system 103, a turbocharger system 106, a refrigeration system 109, and/or other systems. The turbine system 103, the turbocharger system 106, and the refrigeration system 109 can be interconnected using piping, conduit, conductors for power and/or data signals, and/or other components.

The turbine system 103 shown in FIG. 1 can include a high pressure compressor 113, a high pressure turbine 116, a combustor 119, a recuperator 123, and/or other components. The high pressure compressor 113 can be a system configured to receive and compress a mixture of fresh air and recirculated combustion products, as will be described in further detail below. The combustor 119 can be a system that is configured to combust compressed gases to thereby generate a high-temperature flow of combustion gases. The high pressure turbine 116 of the turbine system 103 can be a system in which combustion gases expand and drive a load, such as a generator. As will be described in further detail below, the recuperator 123 can be an energy recovery system that transfers heat from combustion products.

As shown in FIG. 1, the turbocharger system 106 can comprise a low pressure compressor 126, a low pressure turbine 129, and/or other components, including an air cooler 150. In various embodiments, the air cooler 150 is a heat exchanger component that receives intake air and supplies cooled air to the low pressure compressor 126. The low pressure turbine 129 of the turbocharger system 106 can receive combustion products from turbine system 103. In addition, the low pressure turbine 129 can drive the low pressure compressor 126 of the turbocharger system 106.

As shown in FIG. 1, the refrigeration system 109 can comprise a cold gas heat exchanger 133, a hot gas heat exchanger 136, and/or other components. Additionally, a warm gas heat exchanger 139 and a pump 143 may be associated with the refrigeration system 109. In various embodiments, any refrigeration system (e.g., one that uses higher temperature waste heat to generate cooling) can be deployed in the CTE system, including a vapor absorption refrigeration system or a vapor adsorption refrigeration system. For the system of FIG. 1, a vapor absorption refrigeration system is illustrated.

The hot gas heat exchanger 136 of the refrigeration system 109 can receive and transfer heat from combustion products provided by the turbine system 103. The warm gas heat exchanger 139 associated with the refrigeration system 109 can receive and transfer heat from combustion gases provided by the turbocharger system 106 and the hot gas heat exchanger 136. The warm gas heat exchanger 139 can be an intercooler, meaning that it can extract heat from the combustion gases and transfer the heat to an ambient fluid, such as air. The extracted heat can be used to heat water. The cold gas heat exchanger 133 of the refrigeration system 109 can receive and transfer heat from a mixture of air and combustion products provided by the warm gas heat exchanger 139. In addition, the cold gas heat exchanger 133 can be used to generate cold water, as will be described in further detail below. The pump 143 can be used to pump the generated water to various destinations.

FIG. 1 also illustrates the pathways for fresh air, combustion products, and water for the CTE system 100. In particular, the pathways for fresh air and combustion products are shown using dashed lines, and the pathway for water (in liquid and/or gaseous form) are shown using solid lines.

Beginning with a $CO_2$ removal component 140, a mixture of fresh air and recirculated combustion products is processed by a $CO_2$ removal component 140 of the CTE system 100 to remove carbon dioxide ($CO_2$) from the recirculating flow mixture before being supplied to an inlet 146 of the high pressure compressor 113. Thus, various embodiments of the CTE system 100 enable $CO_2$ capture when fueled by hydrocarbons, either for carbon sequestration or for sale. Since the recirculating flow is hardly diluted with excess air, as is a conventional gas turbine, the $CO_2$ mole fraction for the flow mixture is as high as possible depending on a particular location of the $CO_2$ removal component 140. In various embodiments, one or more $CO_2$ removal components 140 can be positioned at different locations within the CTE system, as demonstrated by the dashed ellipses in FIG. 1. In particular, possible locations include, but are not limited to being only, at a position after gas exits the hot gas heat exchanger 136 and before mixing with exiting air from the low pressure compressor 126; at a position that receives exhaust from the low pressure turbine 129; and/or at a position between the cold gas heat exchanger 133 and an inlet of the high pressure compressor 113, as shown in FIG. 1.

Referring again to FIG. 1, in accordance with embodiments of the present disclosure, water is condensed and removed from the flow mixture, further increasing the remaining $CO_2$ mole fraction. In various embodiments, the $CO_2$ removal component utilizes membrane $CO_2$ removal technology (having the $CO_2$ membranes) which is especially suited for the recirculated flow mixture, since after water extraction, the flow mixture is cooled and the gas mixture pressure is typically 4 to 5 atmospheres, making membrane separation easy. Alternatively, in various embodiments, the $CO_2$ removal component 140 utilizes pressure swing adsorption technology and related materials or other $CO_2$ removal technolog(ies) to separate and remove $CO_2$ from the flow mixture. Comparatively, for embodiments of the present disclosure, the $CO_2$ partial pressure is a factor of 20 higher than the exhaust of conventional gas turbines, which provides an ideal situation for $CO_2$ removal. It is noted that carbon dioxide ($CO_2$) is a critical contributor to climate change, as well as having commercial value, especially in oil fields for enhanced oil recovery. After $CO_2$ removal, the mixture of fresh air and recirculated combustion product is supplied to the inlet 146. Further description regarding this mixture of fresh air and recirculated combustion products is also provided below. The high pressure compressor 113 compresses the mixture of fresh air, steam, and recirculated combustion products, and the compressed gases are provided to the cold side of the recuperator 123.

The recuperator 123 heats the compressed gases and provides the compressed gases, along with vapor, to the combustor 119. At the combustor 119, fuel 149 is combusted using the compressed gases to generate a high-temperature flow of combustion gases. These combustion gases are provided to the high pressure turbine 116, where the combustion gases expand and drive a generator and/or any other type of mechanical load. In this way, the turbine system 103 may produce mechanical power and/or electricity for one or more loads. The fuel 149 can include, but is not limited to, any particular combustible fuel, such as a hydrocarbon fuel, hydrogen fuel, without undue NOx emissions, renewable fuel (manufactured using renewable energy as input), synthetic fuels, methanol, etc. Water capture is significantly important when burning hydrogen, as the maximum generation rate of water occurs with that fuel. $H_2$ also consumes water when being created from renewable sources, so the extraction and of water can close the water cycle, thereby not impacting local water resources.

Referring back to the figure, the combustion products from the high pressure turbine 116 are provided to the hot side of the recuperator 123, which transfers heat from the combustion products. The combustion product flow is then divided to be provided to the turbocharger system 106 and the refrigeration system 109.

In particular, a portion of the combustion products from the turbine system 103 is provided to the low pressure turbine 129 of the turbocharger system 106. The combustion products provided to the low pressure turbine 129 drive the low pressure compressor 126. Additionally, exhaust is emitted from the low pressure turbine 129 at outlet 153.

At inlet 156, fresh air is provided to the low pressure compressor 126 of the turbocharger system 106. The fresh air may be filtered, and the inlet 156 may be sound damped. This fresh air is compressed by the low pressure compressor 126. In some embodiments, the fresh air is compressed by a factor of five. As a non-limiting example, if the atmospheric pressure is 1.0 atm, the low pressure compressor 126 compresses the fresh air to a pressure of 5.0 atm. The low pressure compressor 126 may compress the fresh air at other factors in other embodiments. The compressed fresh air is then mixed with combustion products at point 159. The compressed fresh air can also be mixed with the recirculation products between the warm gas heat exchanger 139 and the cold gas heat exchanger 133.

As mentioned above, a portion of the combustion products from the turbine system 103 is also provided to the refrigeration system 109. In particular, this portion of the combustion products is provided to the hot gas heat exchanger 136, which transfers heat from the combustion products. The heat from combustion products provided to the hot gas heat exchanger also drives the refrigeration system 109.

The combustion products may then be provided from the hot gas heat exchanger 136 to point 159 where the combustion products are mixed with fresh air provided by the low pressure compressor 126 of the turbocharger system 106. In some embodiments the combustion products and fresh air are mixed at a 3-to-1 ratio of combustion products to fresh air. The combustion products and fresh air may be mixed at other ratios and/or at other points in the flow path in other embodiments.

The mixture of combustion products and fresh air is then provided to the warm gas heat exchanger 139. The warm gas heat exchanger 139 transfers heat from the mixture of combustion products and fresh air. This transferred heat may be provided to external systems. Additionally, this heat is used to heat water within the CTE system 100, as will be described in further detail below. Additionally, heat transferred by the refrigeration system 109 can also be used to heat water.

The mixture of combustion products and fresh air is then provided from the warm gas heat exchanger 139 to the cold gas heat exchanger 133. The cold gas heat exchanger 133 transfers heat from the mixture of combustion products and fresh air. In some embodiments, refrigerant associated with the cold gas heat exchanger is supplied to the air cooler 150 in order to cool intake air before being passed to the low pressure component 126 of the turbocharger system 106.

In various embodiments, the chilled mixture of combustion products and fresh air is provided from the cold gas heat exchanger 133 of the refrigeration system 109 to the $CO_2$ removal component 140 before being supplied to the inlet 146 of the high pressure compressor 113. It is noted that the discharge of the cold gas heat exchanger 133 has the lowest temperatures within the CTE system 500 which can aid in removal of $CO_2$. The chilled mixture of combustion products and fresh air may result in an improved cycle thermodynamic efficiency relative to other systems that do not provide a chilled mixture of combustion products and fresh air. As a non-limiting example, the chilled mixture may comprise a 3-to-1 ratio of combustion products to fresh air, the temperature of the chilled mixture may be approximately 3° C., and the pressure of the chilled mixture may be approximately 3 atm. The chilled mixture of combustion products and fresh air may have other characteristics in other embodiments.

When the cold gas heat exchanger 133 operates to, for example, chill the mixture of combustion products and fresh air, fresh water may condense on or near the cold gas heat exchanger 133. This fresh water may be provided to external systems. In addition, the fresh water may be provided to the pump 143, which may increase the water pressure.

The water may then be provided to the warm gas heat exchanger 139 and/or the refrigeration system 109. Heat from the warm gas heat exchanger 139 increases the temperature of the water. This hot water may be provided to external systems. Additionally, the hot water is provided from the warm gas heat exchanger 139 to the hot gas heat exchanger 136, which increases the temperature of the hot water to generate steam. The steam may be provided to external systems. Additionally, the steam is provided from the hot gas heat exchanger 136 of the refrigeration system 109 to the recuperator 123 of the turbine system 103.

In alternative examples, instead of the refrigeration system 109 providing steam to the recuperator 123, the refrigeration system 109 can provide water in liquid form to the recuperator 123. In these alternative examples, the liquid water can be provided to a saturator that causes the liquid water to evaporate and mix with the compressed gases from the high pressure compressor 113.

At the recuperator 123, the steam is combined with the mixture of combustion products and fresh air from the high pressure compressor 113 of the turbine system 103. This humid mixture of combustion products and fresh air is then provided to the combustor 119, where the fuel 149 is combusted. The humid mixture of combustion products may result in combustion that is more efficient relative to systems that do not provide a humid mixture of combustion products for combustion.

The CTE system 100 may provide several benefits relative to conventional systems. For example, the CTE system 100 described herein may have a higher "on" design efficiency as compared to conventional turbine systems due to the relatively low temperature entering the turbine system 103. In addition, the CTE system 100 may have a higher "off" design efficiency relative to conventional turbine systems due to holding the turbine system 103 at a relatively fixed set of temperature states. Additionally, the CTE system 100 may be more reliable, quieter, have a lower cost of materials, have a faster time response, and have lower emissions levels relative to conventional systems.

Figure 2A:
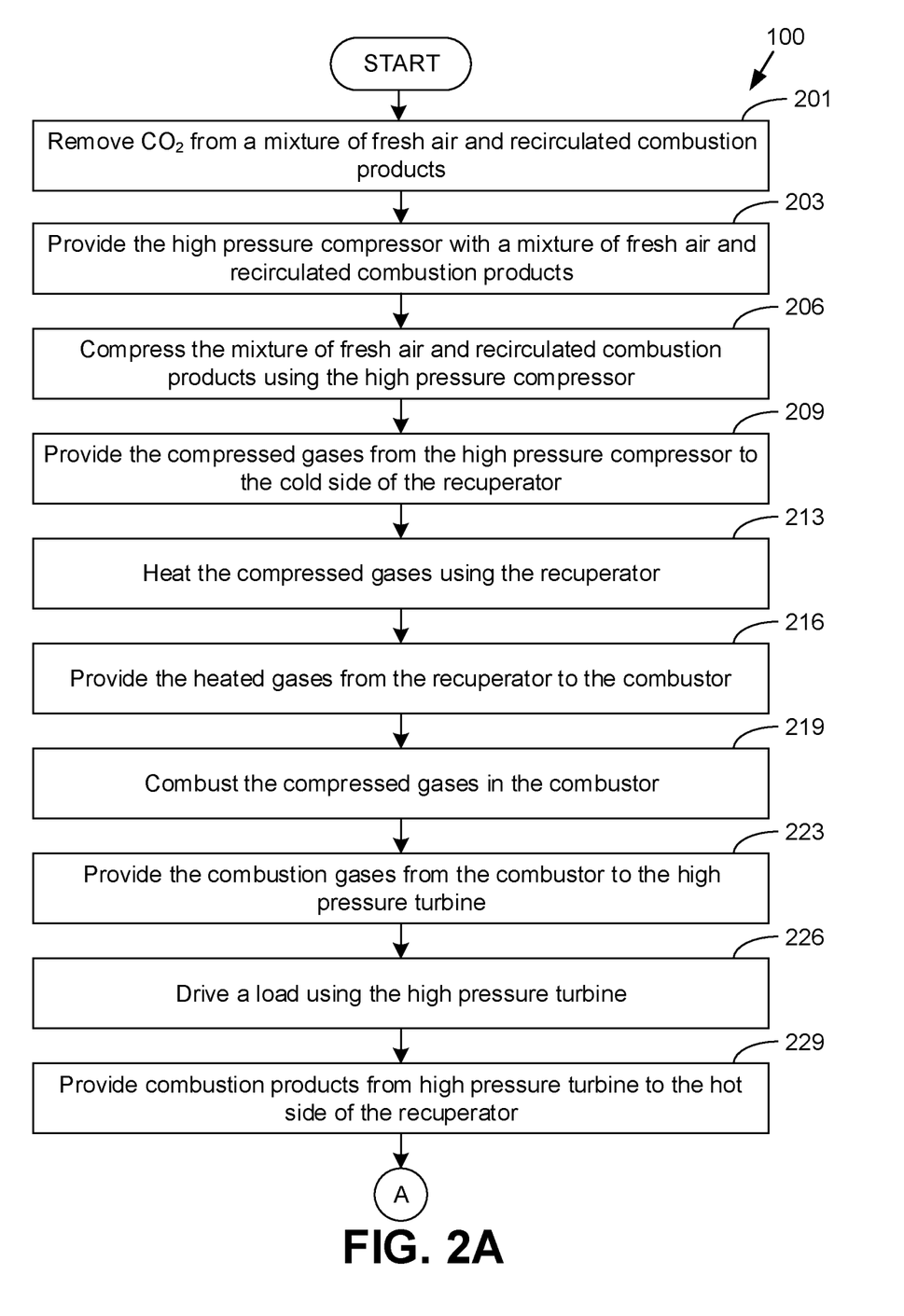
FIGS. 2A-2C are a flowchart illustrating an example of the operation of the CTE system of FIG. 1 according to various embodiments of the present disclosure.
Figure 2B:
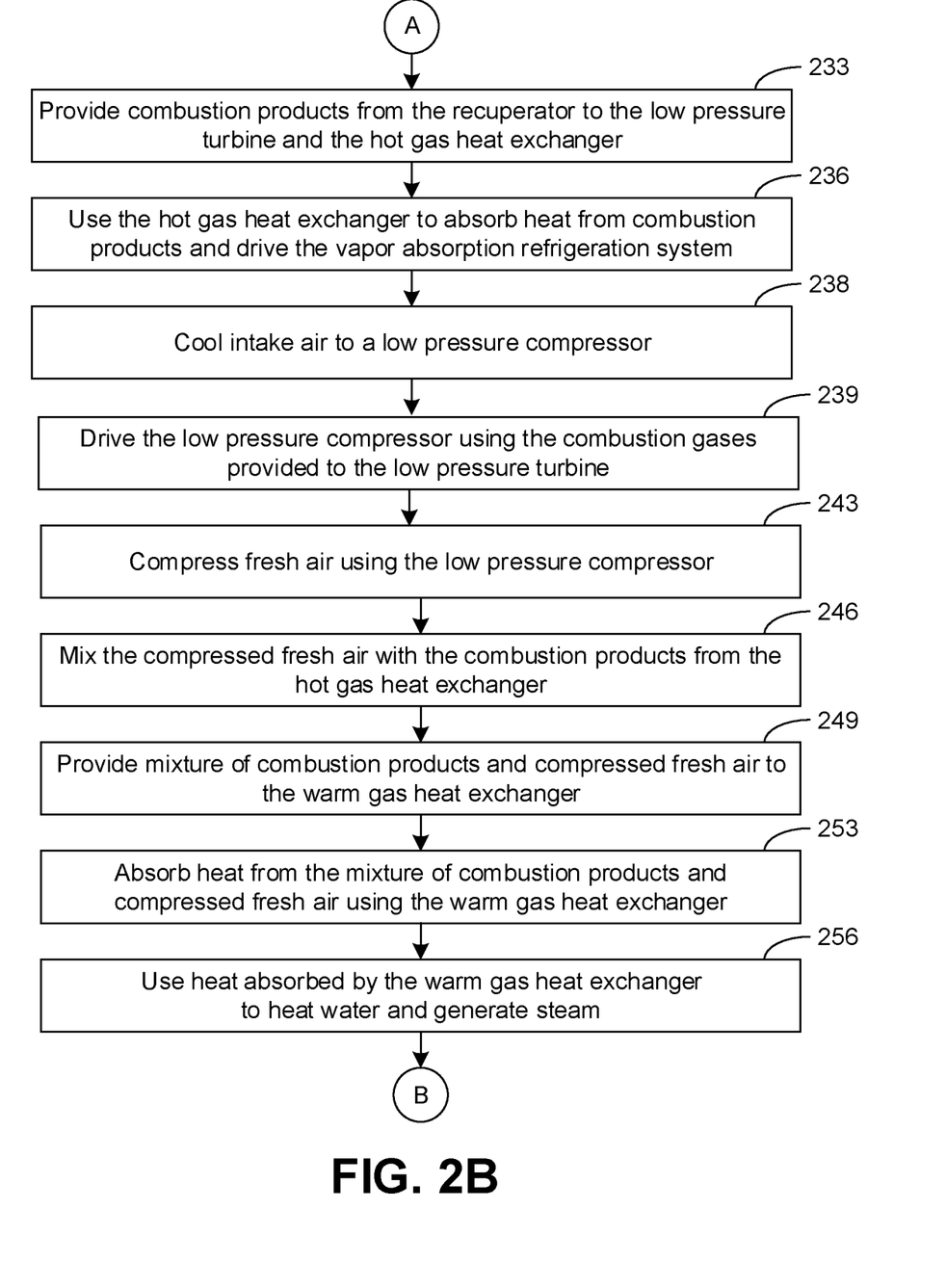
Figure 2C:
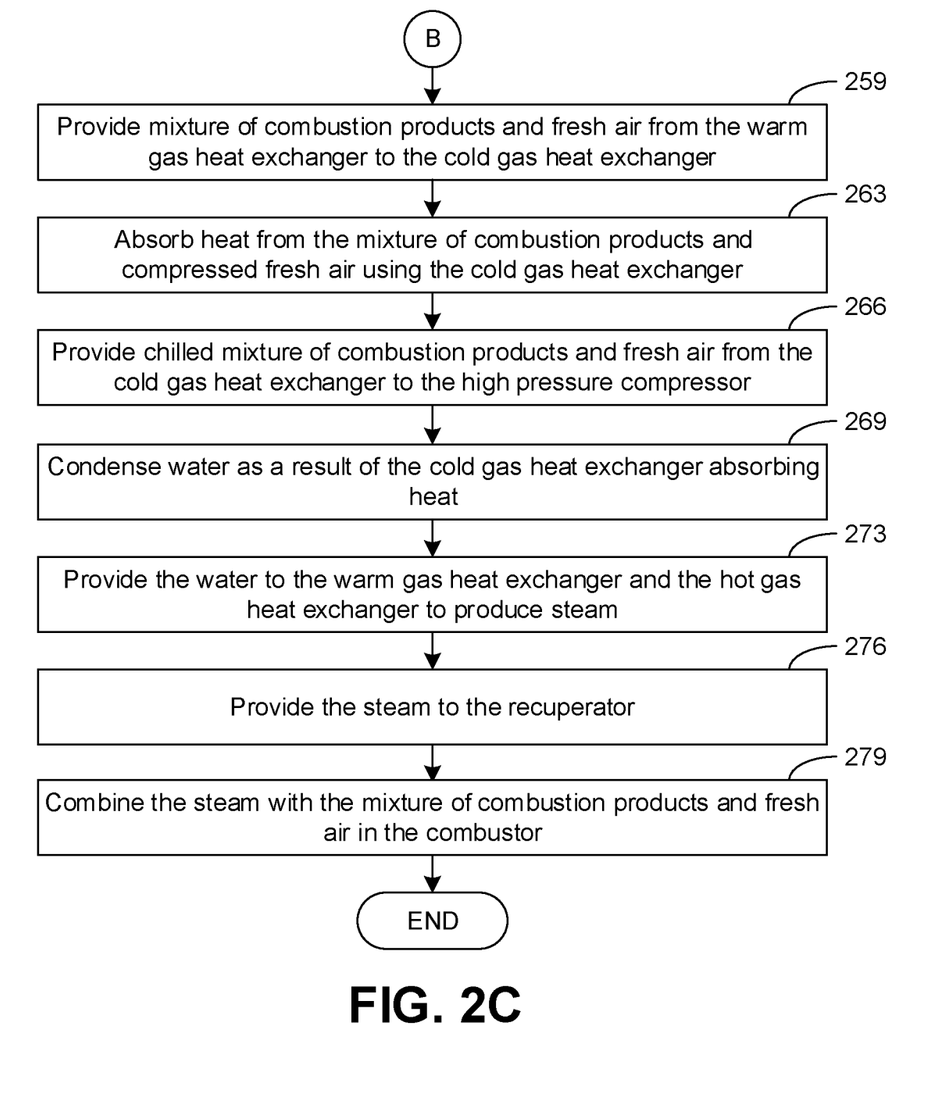

With reference to FIGS. 2A-2C, shown is a flowchart that illustrates an example of the operation of the CTE system 100 according to various embodiments. It is understood that the flowchart of FIG. 2 provides merely one example, among others, of the operation go the CTE system 100. Although the flowchart of FIG. 2 shows a specific order of operation, the order of execution may differ from that which is depicted. For example, the order of performance of two or more boxes may be switched relative to the order shown. Also, two or more boxes shown in succession in FIG. 2 can be performed concurrently or with at least partial concurrence. Further, in some embodiments, one or more of the boxes shown in FIG. 2 can be skipped or omitted.

Beginning with box 201, a $CO_2$ removal component 140 is provided with a mixture of fresh air and recirculated combustion products and operates to remove carbon dioxide ($CO_2$) from the air mixture. Afterwards, at box 203, the high pressure compressor 113 is provided with the mixture of fresh air and recirculated combustion products. At box 206, the mixture of fresh air and recirculated combustion products is compressed using the high pressure compressor 113. The compressed gases are then provided from the high pressure compressor 113 to the cold side of the recuperator 123, as shown at box 209.

At box 213 the recuperator 123 heats the received compressed gases. The heated gases are provided from the recuperator 123 to the combustor 119, as shown at box 213. As indicated at box 216, the heated gases are provided from the recuperator 123 to the combustor 119, and the combustor 119 then combusts the compressed gases, as shown at box 219. At box 223, the combustion gases from the combustor 119 are then provided to the high pressure turbine 116.

At box 226, the high pressure turbine 116 drives a load, such as a generator, as a result of the combustion gases expanding in the high pressure turbine 116. The combustion products are also provided from the high pressure turbine 116 to the hot side of the recuperator 123, as indicated at box 229.

At box 233, which is shown in FIG. 2B, combustion products are provided from the hot side of the recuperator 123 to the low pressure turbine 129 of the turbocharger system 106 and also to the hot gas heat exchanger 136 of the vapor absorption refrigeration system 109. As indicated at box 236, the hot gas heat exchanger 136 transfers heat from the provided combustion products and drives the refrigeration system 109. At box 238, intake air is cooled (via the air cooler 150) before being passed to a low pressure compressor 126. At box 239, the low pressure turbine 129 uses the provided combustion gases to drive the low pressure compressor 126, and the low pressure compressor 126 compresses fresh air, as shown at box 243. The compressed fresh air is then mixed with the combustion products from the hot gas heat exchanger 136, as indicated at box 246.

As shown at box 249, the mixture of the combustion products and compressed fresh air is provided to the warm gas heat exchanger 139. The warm gas heat exchanger 139 transfers heat from the received mixture of combustion products and compressed air, as shown at box 253, and the transferred heat is used by the warm gas heat exchanger 139 to heat water to thereby generate steam, as shown at box 256.

At box 259, which is shown on FIG. 2C, the mixture of combustion products and fresh air are provided from the warm gas heat exchanger 139 to the cold gas heat exchanger 133, where the cold gas heat exchanger 133 transfers heat from the received mixture, as indicated at box 263. Then, as shown at box 266, the chilled mixture of combustion products and fresh are is provided from the cold gas heat exchanger 133 to the high pressure compressor 113. As a result of the cold gas heat exchanger 133 transferring heat, water condenses on or near the cold gas heat exchanger 133, as shown at box 269.

As indicated at box 273, the condensed water is provided to the warm gas heat exchanger 139 and the hot gas heat exchanger 136 to produce steam. At box 276, the steam is provided to the recuperator 123. The steam is then combined with the mixture of combustion products and fresh air in the combustor 119, as shown at box 279. Thereafter, the process ends.

Figure 3:
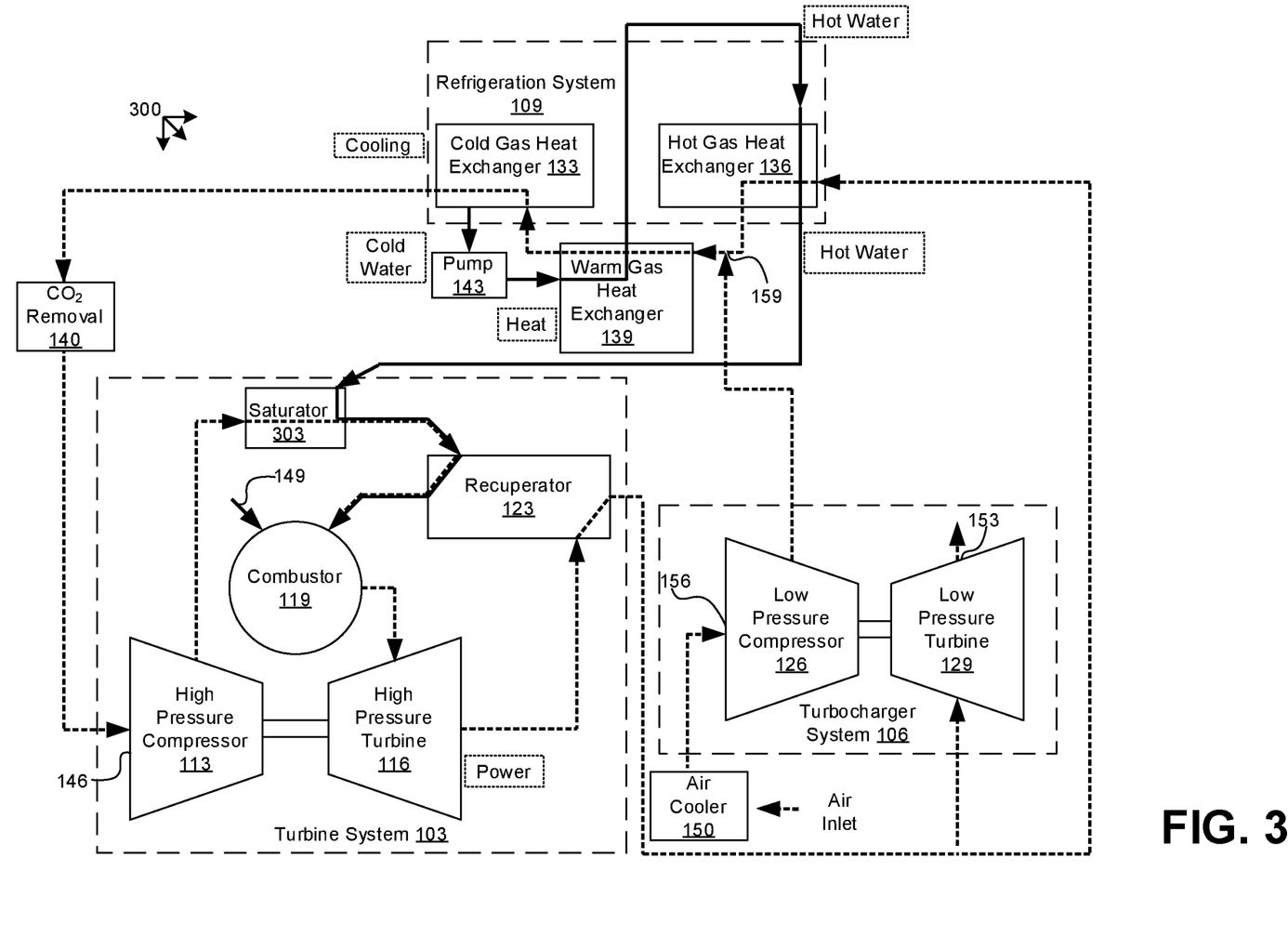
FIGS. 3-8 are drawings of alternative CTE systems and/or components according to various embodiments of the present disclosure.

With reference to FIG. 3, shown is another example of a CTE system 100, referred to herein as the CTE system 300. The CTE system 300 shown in FIG. 3 is similar to the CTE system 100 shown in FIG. 1. However, for the CTE system 300 illustrated in FIG. 3, the turbine system 103 also includes a saturator 303. In addition, instead of providing steam from the hot gas heat exchanger 136, the CTE system 300 provides hot water from the hot gas heat exchanger 136. As shown in FIG. 3, the hot water is provided to a saturator 303. The saturator 303 can cause the received hot water to evaporate and be mixed with the compressed gases from the high pressure compressor 113. The mixture of evaporated water and compressed gases is then provided to the recuperator 123, as shown in FIG. 3.

Figure 4:
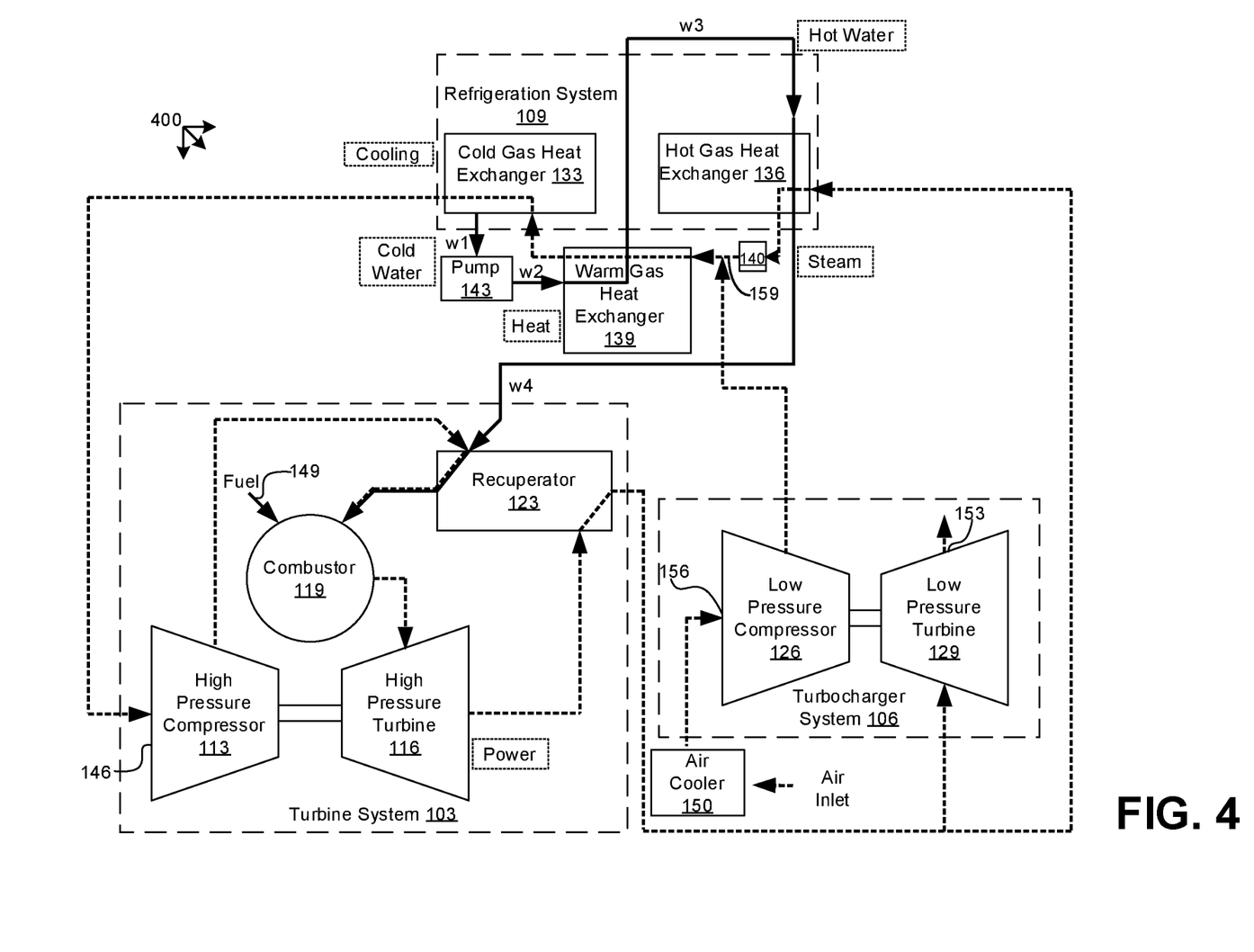

With reference to FIG. 4, shown is another example of a CTE system 100, referred to herein as the CTE system 400. The CTE system 400 shown in FIG. 4 is similar to the CTE system 100 shown in FIG. 1. However, for the CTE system 400 illustrated in FIG. 4, the turbine system 400 integrates the $CO_2$ removal component 140 at a different location than that specified in FIG. 1. For FIG. 4, in one embodiment, the $CO_2$ removal component 140 is positioned to receive exiting gas (containing $CO_2$) from the hot gas heat exchanger 136 and remove carbon dioxide from the gas mixture before being supplied to the warm gas heat exchanger 139. It is noted that the gas exited from the hot gas heat exchanger has the highest $CO_2$ mole fraction (e.g., less diluted) and thus is a prime location for accessing and obtaining carbon dioxide within the CTE system 400.

Figure 5:
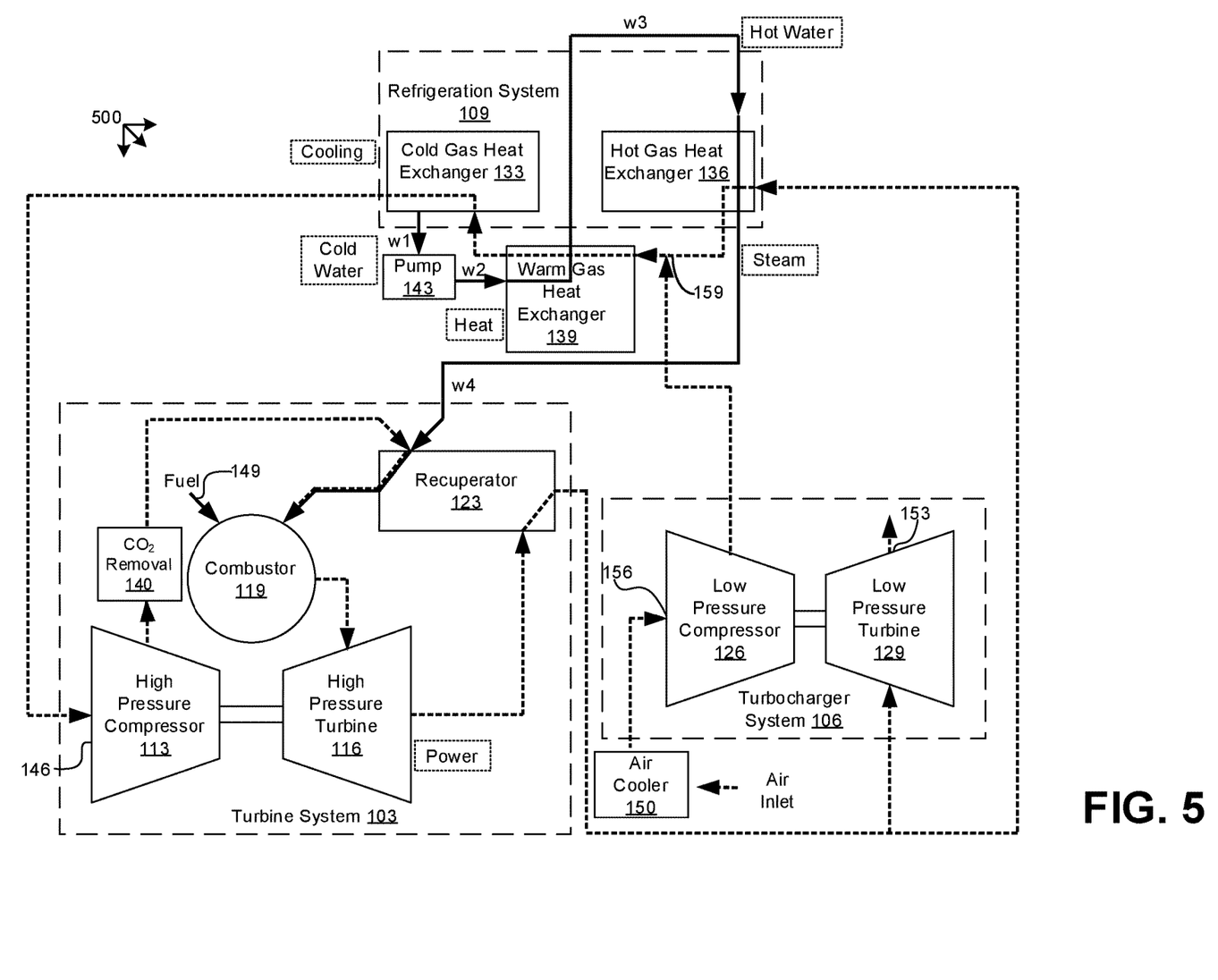

Alternatively, with reference to FIG. 5, a CTE system 500 is shown that is similar to the CTE system 100 shown in FIG. 1 and CTE system 400 shown in FIG. 4. However, for the CTE system 500, illustrated in FIG. 5, the turbine system 500 integrates the $CO_2$ removal component 140 at a different location than that specified in FIG. 1 and FIG. 4. For FIG. 5, in one embodiment, the $CO_2$ removal component 140 is positioned to receive a compressed mixture of fresh air and recirculated combustion products from the high pressure compressor 113 and remove carbon dioxide from the compressed mixture before being supplied to the recuperator 123. It is noted that the discharge of the high pressure compressor 113 has the highest $CO_2$ partial pressure and concentration within the CTE system 500 which can aid in separation of the $CO_2$ during the removal process.

Figure 6:
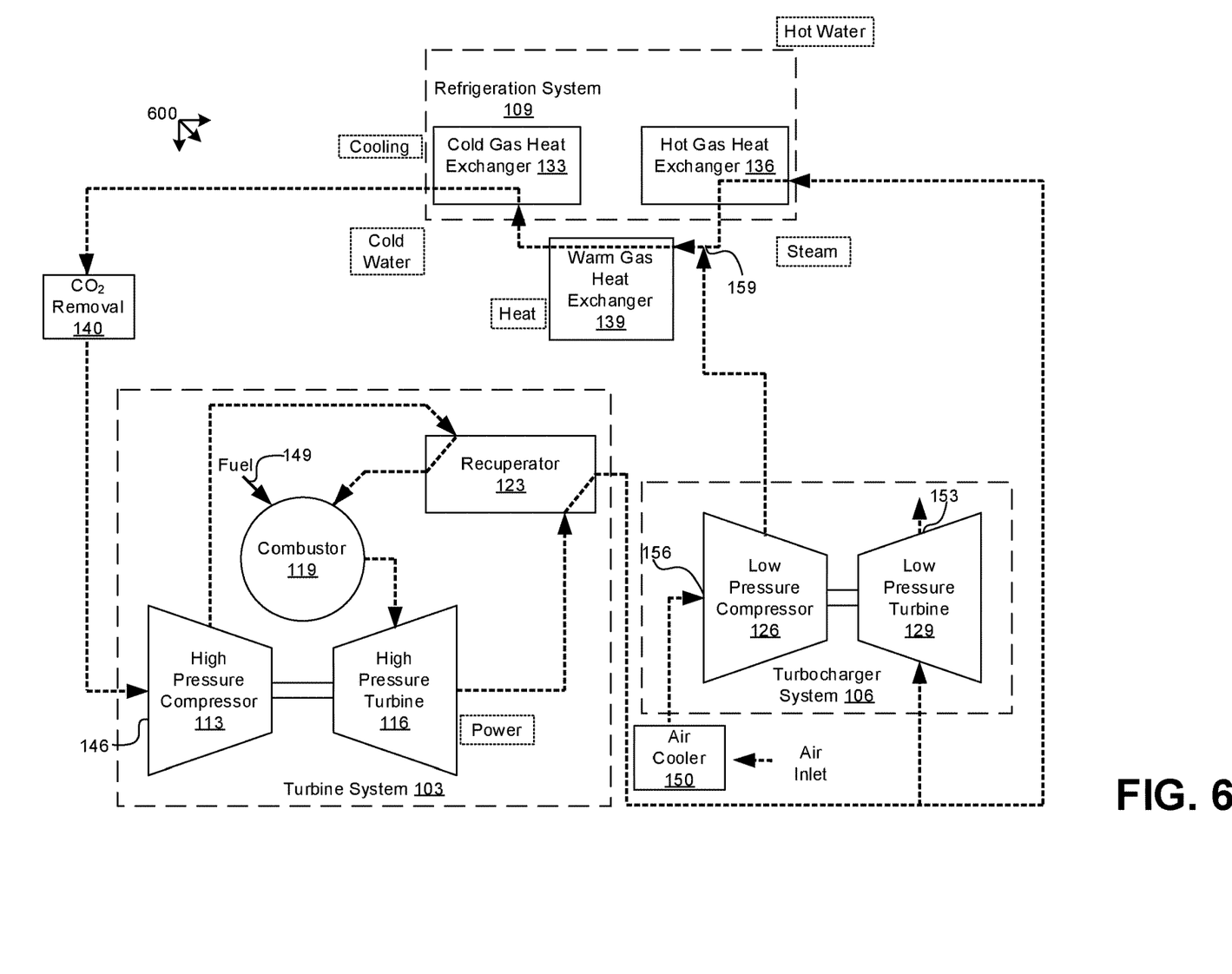

With reference to FIG. 6, shown is another example of a CTE system 100, referred to herein as the CTE system 600. The CTE system 600 shown in FIG. 6 is similar to the CTE system 100 shown in FIG. 1. However, for the CTE system 600 illustrated in FIG. 6, the flow path is simplified by removing the water flow w1-w4 as part of the turbine system 103. Additionally, in various embodiments, the $CO_2$ removal component 140 may be incorporated within the CTE system 600 at a location corresponding to one or more of the locations of $CO_2$ removal components of the systems of FIGS. 1 and 4-5 and/or at a different location within the CTE system 600.

Figure 7:
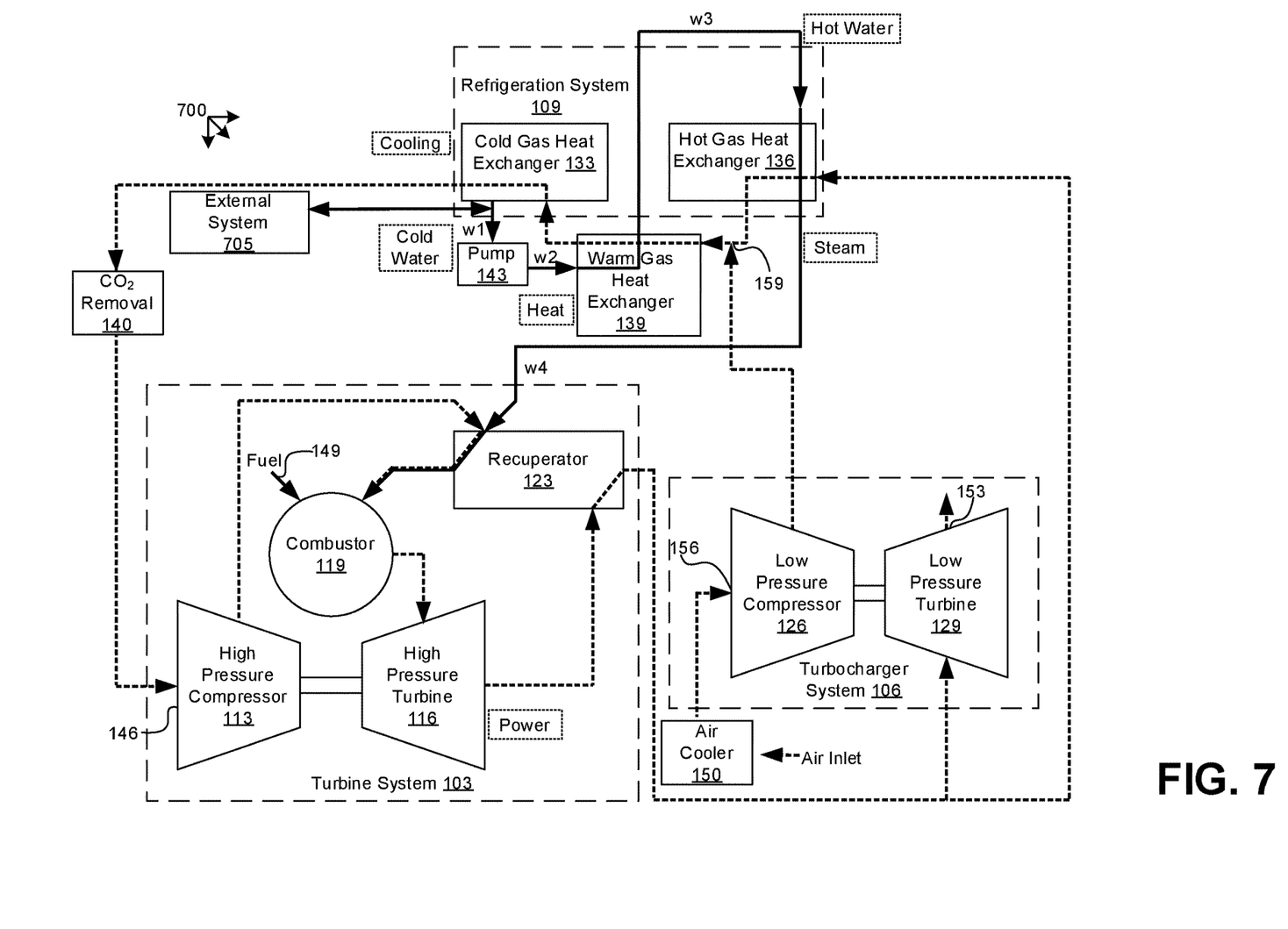

With reference to FIG. 7, shown is another example of a CTE system 100, referred to herein as CTE system 700. The CTE system 700 diverts a portion of the fresh water condensed on or near the cold gas heat exchanger 133 to external system(s) 705, whereas a remaining portion of the water is supplied to the pump 143, which may increase the water pressure. Accordingly, in various embodiments, a percentage of water diverted from the pump 143 to the external system(s) 705 can be set during a design of the CTE system and can range from 0 to 100 percent of the water supplied from the cold gas heat exchanger 133. Alternatively, or in addition to, in certain embodiments, water can be externally supplied to enter the flow of water supplied to pump 143, thereby increasing the steam flow.

Figure 8:
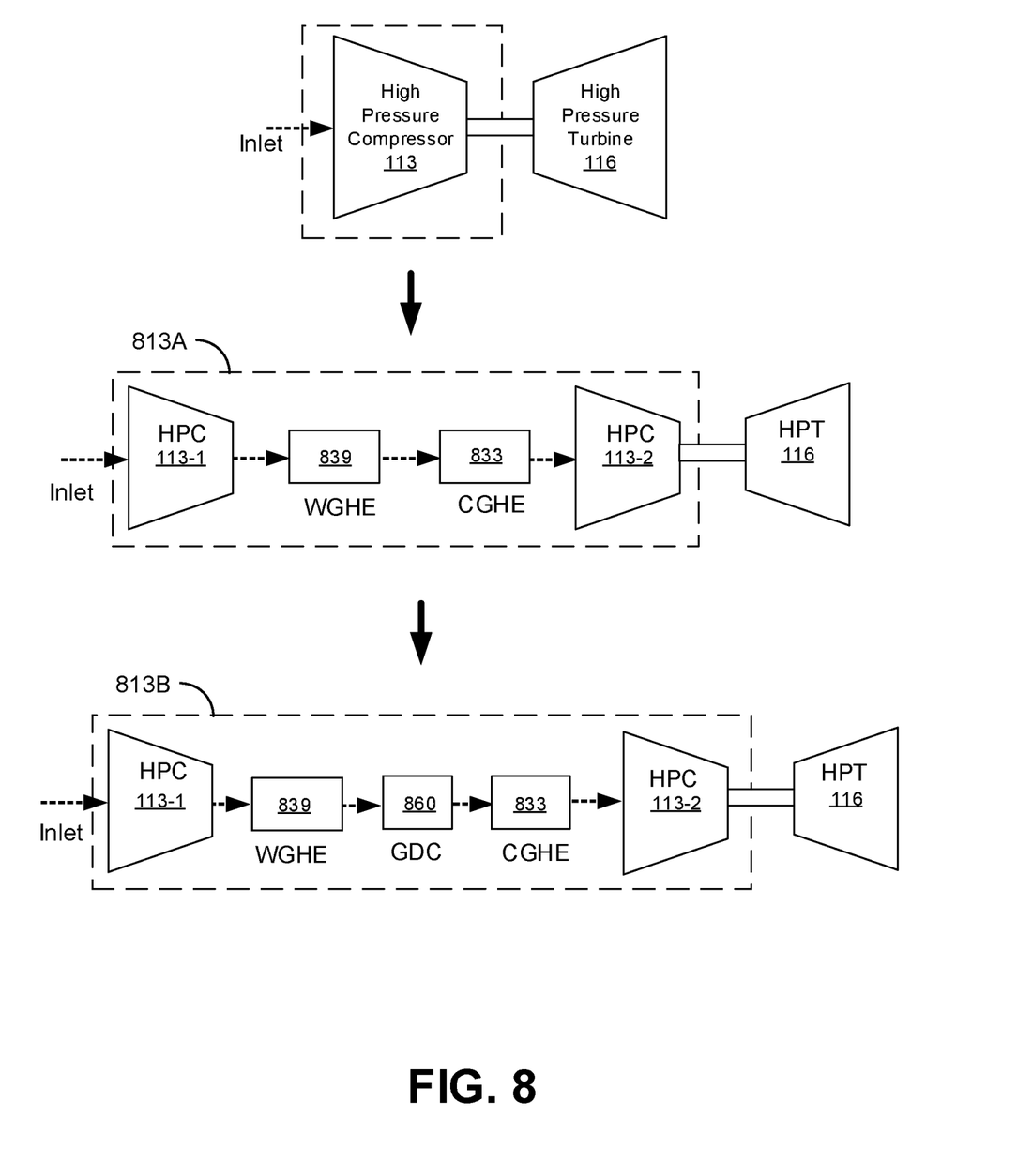

With reference to FIG. 8, shown is another example of a high pressure compressor component of the various embodiments of the CTE system, referred to herein as a multistage high pressure compressor component 813A, 813B of a CTE system. Therefore, as an alternative to deploying a single stage high pressure compressor 113, various embodiments of a CTE system may deploy high pressure compressor (HPC) components in multiple stages. In various embodiments, the multistage high pressure compressor component 813A, 813B of FIG. 8 can replace the high pressure compressor component 113 of FIGS. 1 and 3-7, where the multistate high pressure compressor component is comprised of multiple component stages. In one such embodiment, an exemplary multistate high pressure compressor component 813A features a first high pressure compressor unit 813-1 that can receive a flow mixture of fresh air and combustion products at an inlet of the first high pressure compressor unit 813-1. Correspondingly, the first high pressure compressor unit 813-1 acts to compress the mixture of air and combustion products and supply the compressed gases to an inlet of a warm gas heat exchanger unit 839.

Accordingly, the warm gas heat exchanger unit (WGHE) 839 can transfer heat from the compressed gases provided by the first high pressure compressor unit 813-1 and supply the gases to a cold heat exchanger unit (CGHE) 833 of the multistage high pressure compressor component 813A. The warm gas heat exchanger unit 839 can be an intercooler, meaning that it can extract heat from the compressed gases and transfer the heat to an ambient fluid, such as air, or to a heat load before passing or directing the compressed gases to the cold gas heat exchanger unit 833.

The cold gas heat exchanger unit 833 can transfer heat from the compressed mixture of air and combustion products provided by the warm gas heat exchanger unit 839. In various embodiments, a refrigerant is supplied to the cold gas heat exchanger unit 833 (e.g., from the refrigeration system 109) in order to cool intake gases. Then, the cold gas heat exchanger unit 833 supplies the cold compressed gases to an intake of a second high pressure compressor unit 813-2 of the multistage high pressure compressor component 813A. Correspondingly, the second high pressure compressor unit 813-2 acts to compress the intake gases and pass the compressed gases to other component(s) of the CTE system, such as an inlet of the recuperator 123. The intercooling of the high pressure compression process using a coolant or refrigerant can lower a temperature of the mixture of gases below ambient temperatures, thereby reducing the compression power and increasing an efficiency of the respective CTE system (e.g., by 5-7 percent). The foregoing setup is suited for conditions where ice is not likely to form during the cooling of the gases below ambient temperatures.

In an alternative embodiment of the multistage high pressure compressor component 813B, where the temperature of the gases may be lowered below freezing temperatures resulting in a risk of ice formation, the cool gas heat exchanger 833 may include a direct-contact heat exchange process using a hydrophilic desiccant material, such as, but not limited to, glycol, between the warm gas heat exchanger 839 and cold gas heat exchanger 833 components. In one such embodiment, a multistage high pressure compressor component 813B features a gas dehydration chamber 860 as an additional stage in addition to the stages featured within the multistage high pressure compressor component 813A.

For example, in various embodiments, after the gas is cooled in the warm heat gas exchanger unit 839 (e.g., to temperatures slightly warmer than ambient), the cooled gas can be supplied to the gas dehydration chamber (GDC) 860 in which a hydrophilic desiccant material (with a low water content) is chilled to a desired sub-freezing temperature and is brought into contact with or exposed to the cooled gas, such as in the form of a spray. The gas may then cool (e.g., to sub-freezing temperatures) at the same time that most of the water vapor from the gas is captured by the desiccant material, so that no ice forms, such that the sub-freezing temperatures at the entrance to the second high pressure compressor unit 813-2 can provide a further increase in efficiency. In operation, the saturated desiccant material can be regenerated by using waste heat from the warm heat gas exchanger 839 to drive water from the desiccant material and the regenerated desiccant material can be resupplied to the gas dehydration chamber 860, where the captured water can be repurposed and/or harvested. In various embodiments, the desiccant material may be in a liquid form, such as an aqueous glycol fluid, although solids may be deployed in certain embodiments. In general, various water capturing agents can be used, such as liquid capturing agents that capture water via absorption and/or solid capturing agents that capture water via adsorption. It is also noted that a gas dehydration chamber 860 may also be utilized in the refrigeration system 109 (e.g., of FIGS. 1 and 3-7) between the respective warm gas heat exchanger 139 and cold gas heat exchanger 133 components in accordance with various embodiments of the present disclosure.

Exemplary non-limiting use scenarios for embodiments of a an improved combustion turbine engine systems (CTE) and related methods include integration with grid control systems to allow CTE systems to provide grid services; integration with steam gasification systems that utilize water and heat produced by CTE systems to efficiently and cleanly process wastes; use of multiple fuels in the same CTE system to allow arbitrage while simultaneously facilitating the transition from fossil fuels to renewable fuels; and/or the use of small CTE systems for mobile and remote applications such as military, among others.

Regarding grid services, at least two forms of services are currently required to maintain grid stability. First, the electrical demand must be met at all times by a combination of generated power plus power from storage. Second, spinning reserves are required, whereby some generation plants are idling in case of unexpected loss of generation or sudden increase in demand. Both forms are currently expensive and wasteful of energy. An exemplary CTE system has features that allow it to provide both kinds of grid services. For example, high part-power efficiency allows CTE systems to operate at less than full power without sacrificing efficiency. The fast transient response allows the generation to respond rapidly to central control, helping to maintain load balance (i.e., generation matches demand) without relying on storage. Centralized grid control (and microgrid control) is evolving rapidly, and CTE attributes are an excellent fit for integration into the envisioned overall control scheme. Load balancing typically requires adjusting the power output on time scales on the order of seconds to tens of seconds, which an exemplary CTE can easily do. On the other hand, heat demand typically has time scales on the order of minutes, so CTE installations in combined heat and power (CHP) mode can meet the heat demand while simultaneously contributing to balancing the electrical load. Spinning reserves are indirectly provided in this scenario, since many (perhaps thousands) of CTE plants can run at less than full power. In the event of an unexpected sudden increase in demand, many CTE plants can be commanded to increase power until another plant can be started. This is similar to current spinning reserve operation, except that the warmed-up CTE plants are not wasting fuel by idling.

Next, regarding steam gasification systems, one promising approach for dealing with municipal solid waste, water treatment waste, sludge, and other waste streams is to gasify the material using high temperature/high pressure steam. Such processes have the potential to produce large volumes of hydrogen, while simultaneously allowing resource recovery (such as valuable metals) and minimizing or eliminating landfill material. No air is introduced as in partial oxidation gasification, so the product gasses are not diluted with nitrogen. The steam gasification takes place at temperatures in the 800-1000° C. range, so thermal input is required, in addition to water to produce the steam. Integrating steam gasification with exemplary CTE system(s) would take advantage of the inherent ability of the CTE system to capture water, use its waste heat to generate steam, and provide it to the gasification subsystem. This would allow the overall process to not require water from external sources, while increasing the efficiency substantially. While the steam currently comes from combusting part of the product hydrogen with pure oxygen; the CTE integration would reduce the hydrogen required substantially, using hydrogen only to further superheat the existing steam supplied from CTE system. Thus, the integrated plant would eliminate wastes while providing energy in the form of electricity, heat, and cooling from the CTE system, and hydrogen and recovered resources from gasification, while minimizing the impact on local resources.

For multi-fuel use applications, the combustor in exemplary CTE systems may operate with air strongly diluted with recirculation combustion gas which lowers the maximum flame temperature in the reaction, very much like steam or water injection (effective technologies, but no longer used due to water requirements and cost). Because of the moderate flame temperatures, the combustor can be designed for low $NO_x$ and low CO over a wide range of fuel types. In fact, the combustor may be designed to accommodate many different fuels, allowing the operator to switch between fuels based on economics or low carbon mandates. This capability has a large potential economic benefit, as existing fuels may be chosen to achieve arbitrage, and long term obsolescence is much less likely as fuels such as hydrogen and ammonia replace fossil fuels.

For mobile power unit applications, an embodiment of an exemplary CTE system can be made to be compact and scaled down in size (e.g., to a volume of a standard shipping container) while providing power, heat, air conditioning, and fresh water in remote areas and providing significantly higher power than existing systems for the same volume. It is noted that supplying remote installations currently requires fuel and water (among other logistical requirements). However, since exemplary CTE systems are efficient, less fuel would be required, and since CTE systems can capture fresh water, less water would be required to be transported. Thus, the total logistical burden can be significantly reduced, providing significant economic savings as well as reduced risk in the supply system.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A combustion turbine engine system comprising:
   a turbine system comprising a high pressure compressor, a high pressure turbine, a combustor, and a recuperator;
   a turbocharger system comprising a low pressure compressor and a low pressure turbine;
   an air cooler device that is configured to cool intake air output to the low pressure compressor;
   a refrigeration system comprising a hot gas heat exchanger and a cold gas heat exchanger;
   a warm gas heat exchanger that is associated with the refrigeration system; and a carbon dioxide (CO2) removal component, wherein the air cooler device is configured to receive fresh air that is cooled and supplied to the low pressure compressor, the low pressure compressor is configured to compress the supplied fresh air, the low pressure turbine is configured to drive the low pressure compressor, and the low pressure compressor is configured to supply the compressed air to the warm gas heat exchanger;

wherein the hot gas heat exchanger is configured to receive a combustion product from the recuperator and water supplied from the warm gas heat exchanger, wherein the hot gas heat exchanger is further configured to cool the combustion product from the recuperator using the water supplied from the warm gas heat exchanger and heat the water supplied from the warm gas heat exchanger to form steam using the combustion product from the recuperator, wherein the hot gas heat exchanger is further configured to output the combustion product to the CO2 removal component and supply the steam to the recuperator;

wherein the $CO_2$ removal component is configured to process the combustion product from the hot gas heat exchanger before the combustion product is mixed with the compressed air and supplied to the warm gas heat exchanger;

wherein the warm gas heat exchanger is configured to receive a mixture of the compressed air from the low pressure compressor and the combustion product exiting the $CO_2$ removal component, wherein the warm gas heat exchanger is further configured to receive water supplied from the cold gas heat exchanger, wherein the mixture of air and combustion product is cooled using the water supplied from the cold gas heat exchanger and the water supplied from the cold gas heat exchanger is heated using the mixture of air and combustion product supplied from the low pressure compressor and the recuperator, wherein the warm gas heat exchanger is further configured to supply the cold gas heat exchanger with the cooled mixture of air and combustion product to the cold gas heat exchanger;

wherein the cold gas heat exchanger is configured to further cool the cooled mixture of air and combustion product supplied from the warm gas heat exchanger to generate a cooled combustion product mixture that is provided to the high pressure compressor;

wherein the recuperator is further configured to receive steam outputted from the refrigeration system and to heat the steam and provide the heated steam to the combustor; and wherein the high pressure compressor is configured to compress the cooled combustion product mixture provided from the refrigeration system to form a compressed combustion product mixture, the high pressure compressor is configured to supply the compressed combustion product mixture to the recuperator, the recuperator is configured to heat the supplied compressed combustion product mixture to form a heated compressed combustion mixture and supply the heated compressed combustion mixture to the combustor, the combustor is configured to receive fuel and combust the fuel using the supplied heated compressed combustion mixture to generate a high-temperature flow of combustion gases, the combustor is configured to supply the high-temperature flow of combustion gases to the high pressure turbine that drives at least the high pressure compressor, the high pressure turbine is further configured to supply combustion product from the high pressure turbine to the recuperator, and the recuperator is configured to cool the combustion product supplied by the high pressure turbine and supply the cooled combustion product to the low pressure turbine that drives the low pressure compressor.

2. The system of claim 1, further comprising a pump that is associated with the refrigeration system, wherein the pump provides cold water to a warm gas heat exchanger that heats the cold water.

3. The system of claim 1, wherein the high pressure compressor is deployed in multiple stages through which the cooled combustion product mixture provided from the refrigeration system flow, the multiple stages sequentially comprising a first high pressure compressor unit, a second warm gas heat exchanger unit, a second cold gas heat exchanger unit, and a second high pressure compressor unit.

4. The system of claim 1, wherein the high pressure compressor is deployed in multiple stages through which the cooled combustion product mixture provided from the refrigeration system flow, the multiple stages sequentially comprising a first high pressure compressor unit, a second warm gas heat exchanger unit, a gas dehydration chamber, a second cold gas heat exchanger unit, and a second high pressure compressor unit.

5. The system of claim 1, wherein the high pressure turbine is coupled to and supplies power to an electric grid network.

6. The system of claim 1, wherein the high pressure turbine is coupled to and supplies power to an electric generator.

7. The system of claim 1, wherein the $CO_2$ removal component comprises $CO_2$ membranes.

8. The system of claim 1, wherein the $CO_2$ removal component comprises pressure swing adsorption materials.

* * * * *